United States Patent Office 3,245,928
Patented Apr. 12, 1966

3,245,928
2-HYDROXYMETHYL-5-NORBORNENE POLYMERS AND ESTERS THEREOF
Daniel J. Carlick, Berkeley Heights, N.J., and Michael Becher, Brooklyn, N.Y., assignors to Interchemical Corporation, New York, N.Y., a corporation of Ohio
No Drawing. Filed Sept. 12, 1960, Ser. No. 55,148
13 Claims. (Cl. 260—23)

This invention relates to new synthetic resins. More particularly the invention relates to new resins comprised of homopolymerized hydroxy-containing norbornene derivatives, and to graft polymers made thereon.

Copending application Serial No. 768,839, now U.S. Patent No. 2,985,611, filed October 22, 1958, describes certain copolymers of non-allylic alcohols containing the norbornene nucleus with alkyl esters of acrylic and methacrylic acid. These copolymers have valuable properties, as disclosed in said application, which make them useful in the formulation of coatings. The copolymers of application Serial No. 768,839 are polyols in that at least part of the hydroxyl groups of the non-allylic alcohol are retained in the copolymer. Although these copolymer resins contain hydroxyl groups, it is no generally possible to esterify them with drying oil fatty acids without forming insoluble gels the are useless for coatings, inks, etc.

It has been discovered that the non-allylic alcohols containing the norbornene nucleus, contrary to the teachings of application Serial No. 768,839, can be homopolymerized to give useful resinous polyols. 2-hydroxymethyl-5-norbornene, for instance, gives a hard brittle resin when subjected to temperatures of 100 to 160° C. and free radical catalysts that decompose only at these high temperatures.

Norbornene has the formula $$\begin{array}{c} \text{CH} \\ \text{HC} \overset{|}{\diagup} \diagdown \text{CH}_2 \\ \overset{\|}{\phantom{H}} \phantom{xx} \text{CH}_2 \phantom{x}| \\ \text{HC} \diagdown \phantom{x}\diagup \text{CH}_2 \\ \text{CH} \end{array}$$

and may be conveniently represented by the symbolic formula

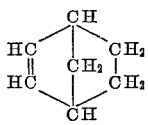

Non-allylic alcohols containing the norbornene nucleus suitable for use in the practice of this invention include 2-hydroxymethyl-5-norbornene,

x-methyl-2-hydroxymethyl-5-norbornene

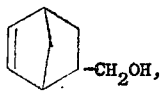

2,2-bis-(hydroxymethyl)-5-norbornene

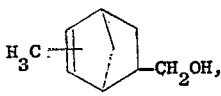

x-methyl-2,2-bis-(hydroxymethyl)-5-norbornene

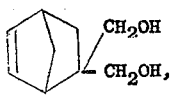

2,3-bis-(hydroxymethyl)-5-norbornene

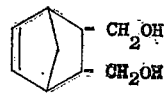

x-methyl-2,3-bis-(hydroxymethyl)-5-norbornene

These non-allylic alcohols containing the norbornene nucleus may all be made by means of known and relatively simple Diels-Alder condensations. The preparation of these Diels-Alder condensation products constitute no part of the instant invention, but will be here outlined very briefly so that those versed in the art of chemical synthesis can readily have the desired materials available for the practice of this invention. 2-hydroxymethyl-5-norbornene may be prepared, following the disclosures of U.S. Patents 2,596,279 and 2,352,606 by heating cyclopentadiene with allyl alcohol, which causes the following reaction to occur:

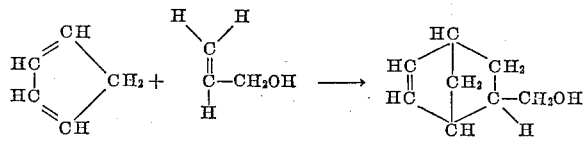

If methylcyclopentadiene is employed instead of cyclopentadiene, the one obtains x-methyl-2-hydroxymethyl-5-norbornene, the x- indicating uncertainty as to the exact position occupied by the methyl group on the 5-atom ring derived from the methylcyclopentadiene starting material.

2-methyl-2-hydroxymethyl-5-norbornene may be prepared conveniently by a Diels-Alder condensation of cyclopentadiene with methallyl alcohol. If methylcyclopentadiene is employed, a 2,x-dimethyl-2-hydroxymethyl-5-norbornene is formed.

The 2,3 - bis - (hydroxymethyl)-5-norbornenes may be prepared similarly by reaction of butene-1,4-diol with cyclopentadiene or methylcyclopentadiene.

The 2,2-bis-(hydromethyl)-5-norbornene can be prepared by condensing cyclopentadiene with acrolein to yield a 5-norbornene-2-carboxaldehyde. By treatment of this aldehyde with two mols of aqueous formaldehyde in the presence of sodium hydroxide, there results an aldolization and cross-Cannizzaro reaction by which there is formed sodium formate and 2,2-bis-(hydroxymethyl)-5-norbornene.

The 2-hydroxymethyl-5-norbornene is most easily prepared by reaction of cyclopentadiene with vinyl acetate to yield 2-acetoxy-5-norbornene, followed by saponification to yield the cyclic alcohol. Similarly, by use of methylcyclopentadiene, one can obtain an x-methyl-2-hydroxymethyl-5-norbornene product.

Among the above non-allylic alcohols containing the norborene uncleus, the primary alcohols are preferred with the 2-hydroxymethyl-5-norborene the most preferred.

The homopolymerization of a non-allylic alcohol containing the norbornene nucleus is preferably conducted in mass and is initiated by "catalysts" or polymerization initiators of the free radical type that decompose at temperatures of 110° C. to 160° C. Di-tertiary butyl peroxide and tertiary-butyl perbenzoate are the preferred catalysts.

Advantageously the properties of the homopolymerization products described above are further modified and improved by graft polymerization with one or more different addition polymerization monomers. In this embodiment of the invention, the desired addition polymerization monomer or monomers are gradually added to the batch containing the preformed homopolymer and the reaction is continued to form the graft polymer. The properties of the graft polymers can be varied depending upon the type and quantity of monomer or monomers that are grafted onto the particular homopolymer. Graft polymers with alkyl esters of acrylic acid or methacrylic acid are an especially preferred species of graft polymers. In general they are clear, hard, tough resins having melting points of 72° C. to 160° C. and are generally soluble in alcohols, aromatics, ketones, and glycols, and are useful in various ink or coating vehicles either as such or by further modification, for example by esterification with drying-oil acids and polycarboxylic acids, or mixtures of drying oil acids and polycarboxylic acids. In this manner unique drying oils, alkyds, and drying-oil-acid modified alkyds are obtainable.

Preferably the homopolymerization is carried out by bubbling oxygen or oxygen-containing gas, such as air, through a solution of the catalyst in the monomer at the appropiate temperature. The technique will generally give a higher yield of resin than is obtained without bubbling oxygen or air through monomer. Further, by employing this technique, temperatures as low as 110° C. can be used to produce homopolymers.

The following examples will further illustrate the invention.

Example 1

2046 g. Cyclol and 91.4 g. di-tertiary-butyl peroxide were heated under a blanket of nitrogen for 2 hours at a temperature of 151–160° C. and then 60.9 g. more of the peroxide were added slowly over a period of 2½ hours. Heating was continued for an additional 7 hours. A balsam-like solid was obtained having a melting point of 131° C. Its acid value was 0 and it was soluble in alcohols, 1:1 butanol-toluene, partly soluble in diethylene glycol, and insoluble in toluene and in methyl ethyl ketone. The yield was 31%.

Example 2

825 g. Cyclol (no catalyst was added) were heated at 145°–150° C. while oxygen was bubbled through at a rate of 3–4 cc. per second. Samples were taken at 2-hour intervals over a period of 12½ hours and were tested for viscosity. The results are shown in the table.

| Time interval in hours: | Viscosity in poises |
| --- | --- |
| 0 | 0.65 |
| 2 | 2.25 |
| 4 | 4.70 |
| 6 | 8.8–10.7 |
| 8 | 10.7–12.9 |
| 10½ | 46.3–63.4 |
| 12½ | >98.5 |

The balsamic solid had a melting point of 95° C. It was soluble in alcohols, 1:1 butanol-toluene, 1:9 butanol-toluene, methyl ethyl ketone, dipropylene glycol, diethylene glycol, 1:1 ethanol-toluene, and was insoluble in toluene. Conversion was 32%

Example 3

935 g. Cyclol and 10 g. di-tertiary-butyl peroxide were heated at 145°–150° C. and oxygen bubbled through at the rate of 3–4 cc. per second. Samples were taken at 2-hour intervals over a period of 10 hours and tested for viscosity. The results are tabulated.

| Time interval in hours: | Viscosity in poises |
| --- | --- |
| 0 | 0.5 |
| 2 | 2.5 |
| 4 | 5.0 |
| 6 | 12.9 |
| 8 | 27.0 |
| 10 | 36.2 |
| 12 | 98.5 |

The balsamic solid obtained had a melting point of 105°–106° C. Its solubilities were the same as those of the product obtained by the process described in Example 2. Conversion was 64–65%.

Example 4

Oxygen, at a rate of 3–4 cc. per second, was bubbled through 744 g. Cyclol containing 7.4 g. of tertiary butyl perbenzoate for 2 hours at a temperature of 130° C. Then the oxygen was cut off and 624 g. of styrene containing 7.5 g. of di-tertiary-butyl peroxide were added dropwise over a period of 2½ hours, the temperature increasing from 130° to 155° C. This phase of the process and the remainder of it was conducted under a blanket of nitrogen. After the addition of styrene, heating was continued for 2 hours more. The solid product obtained melted at 102° C. and contained 81.5% styrene, 18.5% Cyclol according to analysis by ultraviolet spectrophotometric methods.

Example 5

744 g. of Cyclol (6 moles) in which 7.4 g. of tertiary-butyl perbenzoate were dissolved were pretreated by bubbling oxygen through at a rate of 3–4 cc. per second for 2 hours at a temperature of 110° C. The oxygen was then cut off and the material was maintained at a temperature of 135° to 145° C. under a blanket of nitrogen while 604 g. (6 moles) of methyl methacrylate monomer containing 1.2% of di-tertiary-butyl peroxide were added dropwise over a period of 3.5 hours. Heating was continued at 150° C. for 1 hour more and then the unreacted monomers were stripped off under vacuum. Recovery of solids indicated a 60% conversion. They contained 4% hydroxyl (indicating 33% Cyclol).

Example 6

Oxygen was bubbled at the rate of 2 to 4 cc. per second through 1984 g. Cyclol containing 25 g. tertiary-butyl perbenzoate, heated at 110°–115° C., for 2 hours. The oxygen was then cut off and the rest of the process was conducted under a blanket of nitrogen. The temperature was raised to 135°–140° C. and 1840 g. of 2-ethylhexyl acrylate containing 45 g. of di-tertiary-butyl peroxide were added dropwise over a period of 6½ hours. The batch was heated an additional 2 hours at 150° C. 6.5 g. more of the peroxide were added and the heating continued for 15 hours at 150° C. The monomers were stripped off and the recovered solids indicated a conversion of 78%. The solid had a melting point of 72–74° C.

Example 7

For 2 hours oxygen was bubbled at a rate of 3–4 cc. per second through 1984 g. Cyclol containing 25 g. of tertiary-butyl perbenzoate at a temperature of 115° C. The oxygen was then cut off and the rest of the process was carried out under a blanket of nitrogen. 530 g. acrylonitrile containing 25 g. of di-tertiary-butyl peroxide were added over a period of 14 hours at a temperature of 110 to 133° C. After the addition was complete, heating was continued for 2 hours more. The conversion amounted to 23.2%.

Example 8

Oxygen was bubbled through 744 g. Cyclol at a rate of 3–4 per second for 2 hours at 110° C. The oxygen was then cut off and the rest of the process was carried out under a blanket of nitrogen. 515 g. of vinyl acetate containing 7.5 g. of benzoyl peroxide were added dropwise over a period of 5½ hours, the temperature dropping from 110 to 85° C. and then increasing over a further period of 18 hours. The conversion was 21%. The solid obtained had a melting point of 112°–115° C.

Example 9

433 g. of the resin prepared by the method of Example 5 were heated under a blanket of nitrogen with 140 g. of dehydrated castor oil fatty acids at a temperature of 180° to 190° C. for 4¾ hours, the acid number dropping from 53 to 14.5. The recovered solid had a melting point of 120° C.

Example 10

60.9 g. of the resin prepared by the method of Example 2 were heated with 39.1 g. of dehydrated castor oil fatty acids under a blanket of nitrogen at 200° C. until the acid number was 3.0–3.5.

This material was compared with a similar dehydrated castor oil ester made with an epoxy resin having an epoxy equivalent of 875–1025 and a melting point of 95–105° C. Thin films were deposited on glass panels and catalytically air dried. Both were similar in drying speed and hardness. After 6 months' interior exposure the epoxy film had yellowed badly, while the Cyclol resin film was still water white.

Example 11

425 g. of the resin prepared by the method of Example 6 were heated 2½ hours with 98 g. of maleic anhydride at a temperature of 100°–125° C. The acid number dropped from 215 down to 109 via ring opening, as would be expected in reacting 2 equivalents of maleic anhydride with 1 equivalent of the copolymer of Example 6. The resin obtained was a yellow, transparent, balsamic solid. This resin was made up into a 60% solution in styrene and 1% by weight of benzoyl peroxide added. On heating to 80° C. a hard pill was formed by crosslinking. This suggests utility in low-pressure lamination.

Example 12

163.5 g. pentaerythritol were heated to a temperature of 150° C. and then 584 g. of soya fatty acids were added and the temperature increased to 175° C. 195 g. of the graft copolymer made by the process described in Example 5 were added and a temperature of 230° C. maintained until the acid number dropped below 20. 230 g. of phthalic anhydride were then added and heated at 230° C. until the acid number reached 32. The product was liquid at room temperature. When it was diluted with mineral spirits to form a solution having 60% total nonvolatile material, the viscosity of the solution was 8.84 poises.

Example 13

The preceding example was repeated but instead of the methyl methacrylate-Cyclol graft copolymer, there was used instead 77 g. of the homopolymer prepared by the method described in Example 2. The product was a balsamic solid.

In the examples the trade name "Cyclol" is used to designated 2-hydroxymethyl-5-norbornene.

What is claimed is:

1. A solid homopolymer of 2-hydroxymethyl-5-norbornene having a sharp melting point which ranges from about 75° C. to about 131° C.
2. Graft copolymers of 2-hydroxymethyl-5-norbornene homopolymer with at least one monoethylenically unsaturated monomer.
3. Graft copolymers of 2-hydroxymethyl-5-norbornene homopolymer with at least one acrylic type monomer.
4. Resins which comprise the polyesters made by esterifying 2-hydroxymethyl-5-norbornene polymers with monocarboxylic acids.
5. Resins which comprise the polyesters made by esterifying 2-hydroxymethyl-5-norbornene polymers with polycarboxylic acids.
6. Resins which comprise polyesters made by esterifying graft copolymers of 2-hydroxymethyl-5-norbornene homopolymer with monocarboxylic acids.
7. Resins which comprise polyesters made by esterifying graft copolymers of 2-hydroxymethyl-5-norbornene homopolymer with at least one acrylic monomer with monocarboxylic acids.
8. Resins which comprise polyesters made by esterifying graft copolymers of 2-hydroxymethyl-5-norbornene homopolymer with at least one acrylic monomer with drying oil acids.
9. Resins which comprise polyesters made by esterifying graft copolymers of 2-hydroxymethyl-5-norbornene homopolymer with at least one acrylic monomer with mixtures of polycarboxylic and monocarboxylic acids.
10. Resins which comprise the reaction products of maleic anhydride with the graft copolymers described in claim 3.
11. The process of preparing 2-hydroxymethyl-5-norbornene homopolymer which comprises heating 2-hydroxymethyl-5-norbornene in the temperature range of about 110–160° C. in the presence of about 5 to 8%, based on the weight of monomer, of a polymerization initiator of the free radical type that decomposes in the range 110–160° C. and subsequently separating the monomer from the polymer, the yield of polymer being of the order of 31%.
12. The process of preparing graft copolymers of 2-hydroxymethyl-5-norbornene homopolymer with at least one monoethylenically unsaturated monomer, comprising
    (a) pretreating the 2-hydroxymethyl-5-norbornene solution of polymerization initiator by bubbling oxygen through the solution for about 2 hours at about 110–130° C., then cutting off the oxygen,
    (b) slowly adding over a period of about 2–14 hours at least one suitable monoethylenically unsaturated monomer containing a suitable polymerization initiator, this being done under a blanket of nitrogen at about 110–160° C.,
    (c) heating the batch from about 2 hours to about 12 hours more, and
    (d) separating the monomer from the polymer.
13. The process of preparing 2-hydroxymethyl-5-norbornene homopolymer which comprises heating 2-hydroxymethyl-5-norbornene in the temperature range of about 110–160° C. in the presence of about 1%, based on the weight of monomer, of a polymerization inhibitor of the free radical type that decomposes in the range of 110–160° C. while bubbling oxygen through the monomer and initiator and subsequently separating the monomer from the polymer, the yield of polymer being of the order of 65%.

References Cited by the Examiner

UNITED STATES PATENTS

| | | | |
|---|---|---|---|
| 2,352,606 | 7/1944 | Alder et al. | 260—617 |
| 2,588,890 | 3/1952 | Shokal et al. | 260—23 |
| 2,596,279 | 5/1952 | Nichols et al. | 260—617 |
| 2,677,671 | 5/1954 | Yuska et al. | 260—837 |
| 2,853,462 | 9/1958 | Gaylord | 260—31.2 |
| 2,890,202 | 6/1959 | Parker | 260—837 |
| 2,985,611 | 5/1961 | Gaylord et al. | 260—30.8 |

OTHER REFERENCES

Schildknecht, "Vinyl and Related Polymers," 1952, pp. 18 to 20 and 186 and 191.

DONALD E. CZAJA, *Primary Examiner.*

ALPHONSO D. SULLIVAN, MILTON STERMAN, LEON J. BERCOVITZ, *Examiners.*